United States Patent Office 3,438,084
Patented Apr. 15, 1969

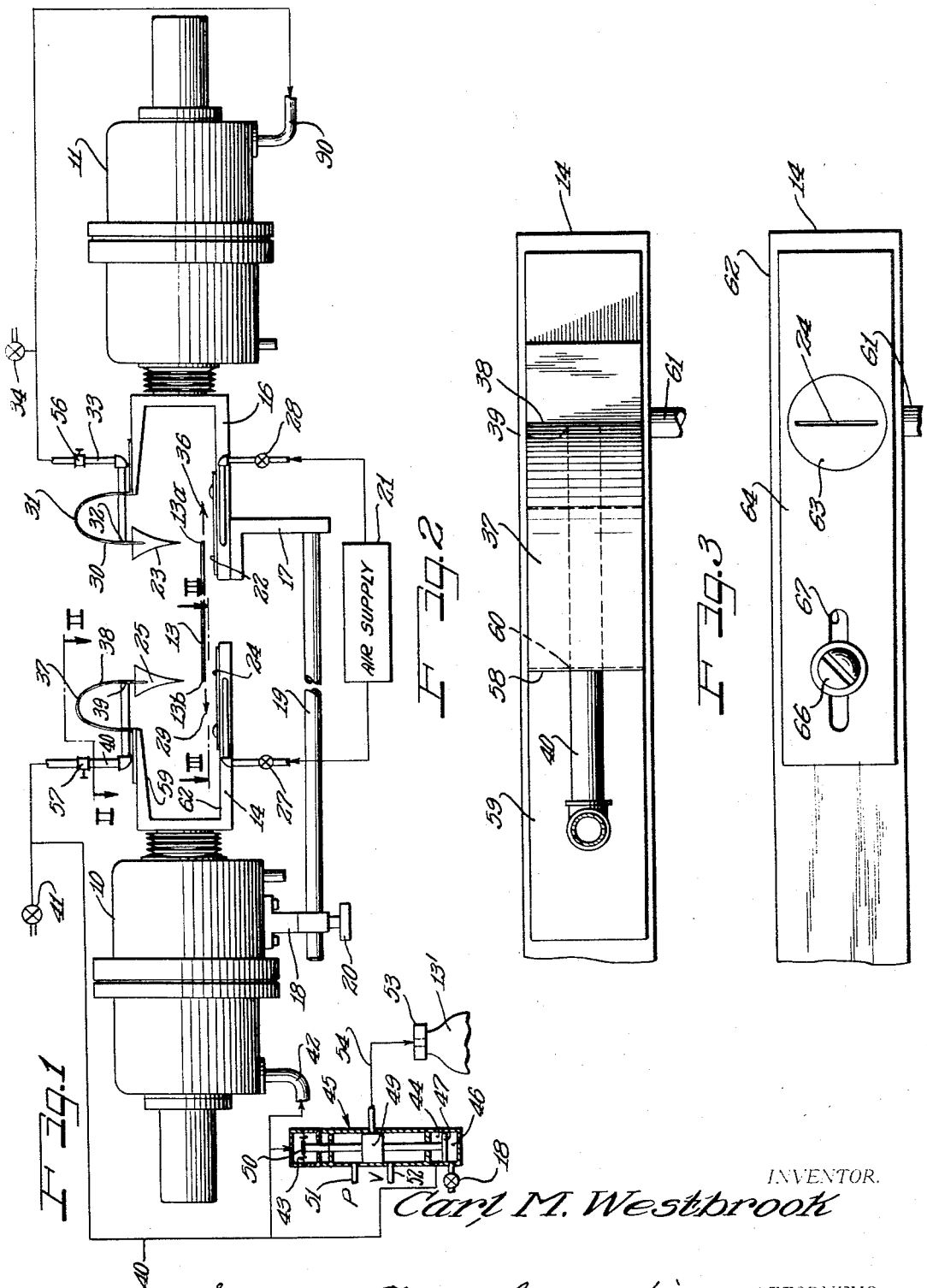

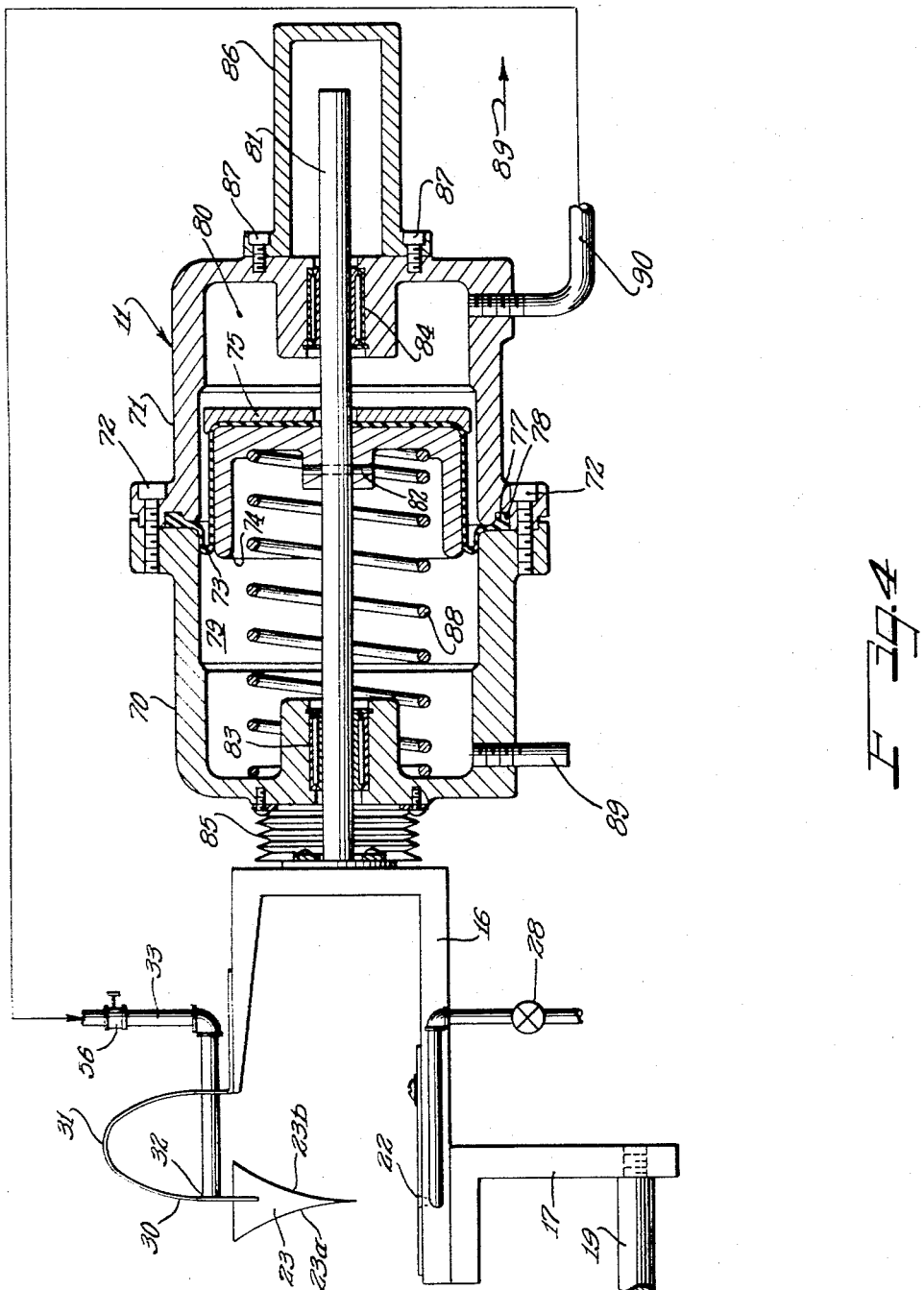

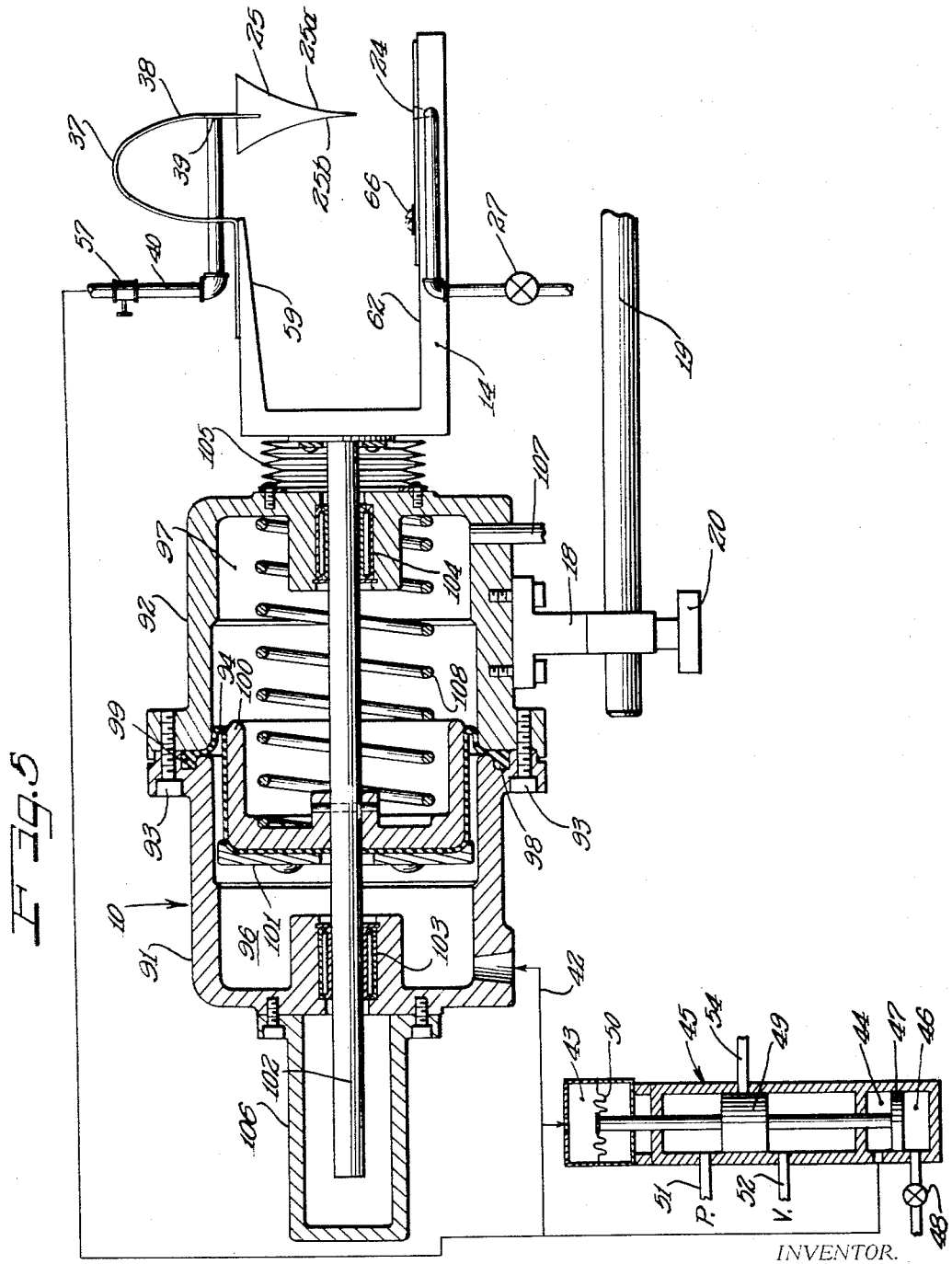

3,438,084
FILM WIDTH SENSING DEVICE
Carl M. Westbrook, Beloit, Wis., assignor to Beloit Corporation, Beloit, Wis., a corporation of Wisconsin
Filed Mar. 8, 1967, Ser. No. 621,560
Int. Cl. G05b 21/00; B29d 7/00
U.S. Cl. 18—2       12 Claims This invention relates generally to a film width sensing and control apparatus, and particularly to an apparatus for sensing and controlling the size of an extruded tubular film which is subsequently pressed by rollers to form a web having two layers.

The manufacture of hollow plastic film is a continuous process, and for reasons of economy, the process must be one by which plastic film can be made at a relatively high speed. Therefore, control devices used in the manufacture of plastic film to control various parameters of the finished product must be of such a nature as to respond to minute changes of the parameter being sensed. However, often the response of sensitive control devices is such that the correcting signal developed thereby may cause a rapid change in that portion of the process which is in control of the parameter being sensed, and this rapid change may be noticeable in the finished product. Furthermore, rapid control of a continuous process may cause hunting of the manufacturing apparatus.

Therefore, in the manufacture of flat hollow film, it is desirable that sensing a control apparatus be sensitive to slight variations of the parameter being sensed and yet provide gradual control of the manufacturing apparatus to restore the particular parameter being sensed to its de-desired condition. This will allow slight variations of the particular parameter being sensed to gradually return to its desired condition, thereby eliminating sudden or noticeable changes in the finished product.

The apparatus of the present invention has particular utility when used in conjunction with the process of manufacturing plastic film, and the detailed description will be limited thereto. However, it will be understood that many of the concepts of the present invention may be used for sensing and controlling the width of other types of continuously moving webs.

Therefore, one of the primary objects of the present invention, particularly from a manufacturing standpoint, is to provide a reliable and simple sensing and control apparatus for the manufacture of film, which will eliminate sudden variations of a particular parameter of the film in response to signal information developed by sensing deviations of the particular parameter.

Another object of the present invention is to provide a film width sensing and control apparatus which is sensitive to slight variations in film width but which will provide gradual control of the manufacturing apparatus.

Another object of the present invention is to provide a film edge sensing device which is sensitive to slight variations in the position of the edge of the film and which sensing device is reliable and inexpensive.

Still another object of the present invention is to provide a film width sensing apparatus for sensing the width of a continuously moving film and which apparatus will automatically compensate for variations in film position as the film passes the sensing apparatus.

A feature of the present invention is the use of a fluid flow sensor which is wedge-shaped and which sensor is suspended by a U-shaped spring.

Briefly, the sensing and control apparatus of the present invention provides a pair of sensing heads which are positioned at opposite sides of a flattened film. Fluid jet streams are directed substantially perpendicular to the edge of the film. The fluid jet stream passing the edge of the film impinges upon the surface of a tapered sensor. Deviations of position of the edge of the film cause variations of the quantity of the fluid jet stream which impinges upon the sensor. A fluid passage is connected to the sensing head and has an opening therein to allow fluid within the passage to escape substantially at right angles to the fluid jet stream which is derived at the sensing head. A resilient spring is connected to the sensing head and has a portion thereof in proximity to the opening of the fluid passage to obstruct fluid flow from the passage. The tapered sensor is fastened to the resilient spring to cause the spring to be urged against the opening of the fluid passage in response to the quantity of fluid of the fluid jet stream impinging upon the tapered sensor.

The portion of the resilient spring which is abutted against the opening of a fluid passage obstructs the fluid flow therefrom, thereby varying the static air pressure within the passage. The pressure within the passage tends to move the resilient spring away from the opening, while the fluid jet stream impinging upon the tapered sensor tends to move the spring toward or away from the opening, depending upon the quantity and direction of the jet stream. The static pressure within the air passage is connected to a pneumatic control valve which, in turn, controls the position of the sensor relative to the edge of the film within predetermined limits. For example, should the edge of the web tend to move away from the jet stream, the sensor and the springs are urged more firmly against the opening of the air passage to cause an increase in the static pressure within the air passage. The increased static pressure within the air passage is sensed by the control valve which, in turn, moves the sensing head in the direction of deviation of the edge of the film. However, should the edge of the web tend to move toward the jet stream, thereby obstructing the flow of the jet stream toward the sensor, the sensor and spring are urged away from the opening of the air passage by the action of the static pressure therein. This allows fluid to escape from the fluid passage thereby decreasing the static pressure within the fluid passage. The control valve will then move the sensing head in the direction of deviation to place the edge of the film at the desired position relative to the fluid jet stream.

The sensing head which is positioned at the opposite edge of the film functions in substantially the same manner. However, the body of the control valve associated with the second sensing head is rigidly connected to the first-mentioned sensing head. Therefore, as the first-mentioned sensing head moves toward or away from the film, the control valve and sensing head positioned opposite thereto will move in the same direction. Therefore, the two sensing heads on opposite sides of the moving film tend to follow lateral movement of the film as the film passes between the sensors. However, should the overall width of the film vary, the second-mentioned sensor will develop a control signal indicative of film width to provide a corresponding change in the manufacturing process to correct the film width.

The invention, however, will be more fully realized and understood from the following detailed description when taken in conjunction with the accompanying drawings in which like reference numerals throughout the various views of the drawings are intended to designate similar elements or components and wherein:

FIG. 1 is an elevational view of the film width sensing and control apparatus constructed in accordance with the principles of this invention and wherein the air connections are illustrated schematically;

FIG. 2 is a top plane view of one of the sensing heads shown in FIG. 1 taken along the line II—II;

FIG. 3 is a top plane view of the same sensing head as shown in FIG. 2 but taken along the line III—III;

FIG. 4 is an elevational sectional view of one of the pneumatic actuators shown in FIG. 1; and FIG. 5 is an elevational sectional view of the other pneumatic actuator shown in FIG. 1 and includes a control valve.

As seen in FIG. 1, a pair of pneumatic actuators 10 and 11 are positioned on opposite sides of a continuously moving web 13. A sensing head 14 is connected to the actuator 10 for movement relative thereto. Similarly, a sensing head 16 is connected to the actuator 11 for movement relative thereto. A bracket 17 is secured to the sensing head 16, and a bracket 18 is secured to the actuator 10. Connected between the brackets 17 and 18 is a rod 19 which serves to maintain the actuator 10 and the sening head 16 separated by a predetermined dimension. One end of the rod 19 is fixedly secured to the bracket 17 while the other end of the rod 19 is slidably connected to the bracket 18. Therefore, the actuator 10 and sensing head 14 can be moved manually toward or away from the sensing head 16 and locked into position by a hand screw 20.

An air supply 21 is in fluid communication with an orifice 22 of the sensing head 16. A tapered airflow sensor 23 is positioned directly opposite the orifice 22. The fluid jet stream from the orifice 22 directed toward the sensor 23 impinges upon the tapered surface thereof and tends to move the sensor 23 in a lateral direction. Similarly, the air supply 21 is in fluid communication with an orifice 24 which is positioned on the sensng head 14 directly opposite a sensor 25. A portion of the jet stream from the orifice 22 is interrupted by the edge 13a of the web 13, and a portion of the jet stream from the orifice 24 is interrupted by the edge 13b of the web 13. As the edges of web 13 tend to move laterally the quantity of air which impinges upon the sensors 23 and 25 respectively will vary.

A pair of presure reducing valves 27 and 28 are connected between the air supply 21 and the orifices 24 and 22 respectively to maintain the jet stream from the orifices at a predetermined value. Should the web 13 move in the direction indicated by the arrow 29, more of the jet stream from orifice 22 will impinge upon the sensor 23 to urge a substantially straight leg portion 30 of a U-shaped spring 31 against an opening 32 of an air passage 33. However, the pressure in the passage 33 tends to urge the leg 30 away from the opening 32. The cooperating action between the jet stream from orifice 22 and the pressure in the passage 33 cause the leg 30 to be urged against the opening 32 to a greater or lesser degree depending upon the jet stream from the orifice 22.

The air passage 33 is in fluid communication with a valve 34 which, in turn, is connected to a suitable air supply, not shown. As the static air pressure within the air passage 33 increases, due to the restriction afforded by the leg 30 which is over the opening 32, the increased pressure is sensed within a chamber of the actuator 11. This causes the sensing head 16 to be moved in the direction of the arrow 29. The sensing head 16 continues to move toward the edge 13a of the film 13 until the jet stream is again impeded by the edge 13a.

It will be noted that as the sensing head 16 is moved in the direction indicated by the arrow 29, so also is the actuator 10. Therefore, if the film 13 did not decrease in width, but merely moved laterally, the entire width sensing apparatus would move laterally to maintain the edges 13a and 13b in the proper sensing relation to the sensing heads 16 and 14, respectively. However, should the edge 13a move in the direction indicated by the arrow 36, the jet stream from orifice 32 is obstructed thereby allowing the sensor 23 and the leg portion 30 to be moved further away from the opening 32 of the air passage 33. This action will cause the static air pressure within the air passage 33 to decrease thereby decreasing the static pressure within the chamber of the actuator 11. Therefore, the sensing head 16 will move in the direction indicated by the arrow 36 until the edge 13a is once again in the proper sensing relation within the sensing head 16.

The sensor 25 is connected to a U-shaped spring 37 which, in turn, has a leg portion 38 in proximity with an opening 39 of an air passage 40. Should the edge 13b of the web 13 tend to move in the direction indicated by arrow 36, more of the jet stream from the orifice 24 will impinge upon the sensor 25 thereby causing the sensor 25 to urge the leg portion 38 more firmly against the opening 39 of the air passage 40. This action will cause the static pressure within the air passage 40 to increase. However, should the edge 13b tend to move in the direction indicated by the arrow 29, less of the jet stream from the orifice 24 will impinge upon the sensor 25, thereby allowing the static pressure within the air passage 40 to move the sensor 25 and the straight portion 38 away from the opening 39. This action will cause the static pressure within the air passage 40 to bleed through the opening 39 thereby decreasing the pressure within the passage 40.

The air passage 40 is connected to a valve 41 which, in turn, is connected to a suitable air supply, not shown. Also, the air passage 40 is connected to a chamber within the actuator 10 via an air line 42. Therefore, variations in the position of the edge 13b are sensed by the sensor 25 to cause corresponding variations in the static pressure within the air passage 40. An increase in static pressure within the air passage 40 will cause the actuator 10 to move the sensing head 14 in the direction indicated by arrow 36. On the other hand, a decrease in static pressure within the air passage 40 will move the sensing head 14 in the direction indicated by the arrow 29.

Also in fluid communication with the air passage 40 is a chamber 43 and a chamber 44 of a control valve 45. A chamber 46 of the valve 45 is separated from the chamber 44 by a piston 47, and the chamber 46 is in fluid communication with a reference supply pressure through a reducing valve 48. The air pressure within the chamber 46 is a reference pressure and serves to dampen the operation of the control valve 45, thereby improving the operation of the valve 45. A reference pressure of 5 p.s.i. is preferable although reference pressure other than 5 p.s.i. may be used.

The piston 47, within the control valve 45, is connected to a piston 49 which, in turn, is connected to a diaphragm 50, as seen in FIG. 1. The piston 47 may be replaced by a diaphragm and the diaphragm 50 may be replaced by a piston, as desired. A relatively low pressure supply is connected to the control valve 45 via the line 51. Also a relatively low vacuum supply is connected to the control valve 45 via line 52. The pressure differential on opposite sides of the piston 49 is sufficiently low so as not to effect movement of the piston 49. The output of the control valve 45 is connected to a suitable molten plastic extruder 53 via line 54. The thin plastic film 13' passes from the extruder 53 and the size of the film is controlled by air pressure supplied to the interior thereof through line 54.

A needle valve 56 is connected to the fluid passage 33 to control the maximum quantity of fluid which may pass through the opening 32. The needle valve 56 may be used to set the desired operating condition of the actuator 11. Similarly, a needle valve 57 is connected to the fluid passage 40 to control the maximum quantity of fluid which may pass through the opening from the passage 40.

Seen in FIG. 2 is a top plan view of the sensing head 14 as taken along the line II—II of FIG. 1. A leg portion 58 of the U-shaped spring 37 is secured to an upper extended portion 59 of the sensing head 14. The air passage 40 passes through an opening 60 of the leg portion 58 and is terminated in proximity of the leg portion 38.

As best seen in FIG. 3, an air line 61 is connected to a lower extended portion 62 of the sensing head 14 and is in fluid communication with the orifice 24. The orifice 24 is in the form of a rectangular slot which is cut into a round plate 63. The plate 63 may be rotated to change the position of the jet stream from the orifice 24, as desired. The round plate 63 is carried by a rectangular plate 64 which, in turn, is secured to the extended portion 62 by a screw 66. The rectangular plate has an elongated slot 67 for receiving the screw 66. Therefore, the plate 64 can be adjusted relative to the extended portion 62, as desired.

For a better understanding of the detail construction and operation of the actuator 11, reference is now made to FIG. 4. The actuator 11 comprises a pair of housings 70 and 71 which are connected together by a plurality of bolts 72. An elastic diaphragm 73 is held between a diaphragm holder 74 and a diaphragm plate 75. The periphery of the diaphragm 73 has a rim 77 which fits into a notch 78 between the housings 70 and 71. The rim 77 of the diaphragm 73 is held in place by the housings 70 and 71 to provide a pair of chambers 79 and 80 which are separated by the diaphragm 73.

The diagram holder 74 is connected to a shaft 81 by a pin 82. The shaft 81 passes through a pair of bushings 83 and 84 which are carried by the end walls of the housings 70 and 71, respectively. One end of the shaft 81 extends through the housing 70 and is connected to the sensing head 16 for movement therewith.

A dust cover 85 is positioned about the end of the shaft 81 between the sensing head 16 and the outer surface of the end wall of the housing 70 to prevent foreign material from being collected on the shaft 81. The other end of the shaft 81, which extends through the end wall of the housing 71 is protected by an end cover 86 which is secured to the housing 71 by a plurality of screws 87. Positioned between the interior end wall of the housing 70 and the diaphragm holder 74 is a coil spring 88 which serves to bias the diaphragm 73 and the shaft 81 in the direction indicated by the arrow 89.

The chamber 79 is preferably maintained at atmospheric pressure. However, the chamber 79 may receive a reference pressure through a line 89. The static pressure within the fluid passage 33 is sensed by the chamber 80 via a line 90. As mentioned hereinabove, an increase in static pressure within the chamber 80 tends to move the sensing head 16 in the direction of the arrow 29 of FIG. 1. On the other hand, a decrease in static pressure within the chamber 80 tends to move the sensing head 16 in a direction indicated by the arrow 36 by the action of the coil spring 88.

Referring now to FIG. 5, the actuator 10 comprises a pair of housings 91 and 92 which are connected together by a plurality of bolts 93. A diaphragm 94 is positioned between the housings 91 and 92 to provide a pair of chambers 96 and 97 on opposite sides of the diaphragm 94. The periphery of the diaphragm 94 has a rim 98 which fits into a notch 99 between the housings 91 and 92. The diaphragm 94 is formed about a diaphragm holder 100 and secured thereto by a diaphragm end plate 101.

A shaft 102 passes through the opposing end walls of the housings 91 and 92 and has one end thereof secured to the sensing head 14. A pair of bushings 103 and 104 are carried by the end walls of the housings 91 and 92 respectively. A dust cover 105 is positioned about the shaft 102 between the exterior of the end wall of the housing 92 and the sensing head 14, while an end cover 106 is secured to the exterior of the end wall of the housing 91 and over the extended end portion of the shaft 102.

The chamber 97 is preferably maintained at atmospheric pressure. However, the chamber 97 may be connected to a reference supply pressure through a line 107. The chamber 96 is in fluid communication with the air passage 40 via the line 42. Therefore, an increase in static pressure within the air passage 40 will cause the sensing head 14 to move in the direction of the arrow 36 of FIG. 1. On the other hand, a decrease in static pressure within the chamber 96 will cause the sensing head 14 to move in the direction of the arrow 29 of FIG. 1.

In the preferred embodiment of the present invention, the axial dimension of the piston 49 within the control valve 45 is greater than the axial dimension of the opening of the output line 54. By so proportioning the axial dimension of the piston 49, the pressure control signal delivered to the output line 54 is slightly delayed. This action facilitates damping of undesired hunting and minimizes sudden changes in the width of the extruded film.

In operation, a portion of the jet streams from the orifices 22 and 24 is interrupted by the edge of the film 13. The sensors 23 and 25 are tapered and pointed toward the orifices 22 and 24 respectively in such a manner as to receive the jet streams therefrom on opposite side walls of the sensors 23 and 25. That is, a portion of the jet stream from the orifice 22 impinges upon the wall surface 23a while a further portion of the jet stream from the orifice 22 impinges upon the wall 23b. Similarly, a portion of the jet stream 24 impinges upon the wall 25a while still another portion of the jet stream 24 impinges upon the wall 25b. Therefore, the sensors 23 and 25, together with the straight portions 30 and 38 connected to the respective sensors are urged toward or away from the orifices 32 and 39 depending upon the quantity of jet stream impinging upon opposite side walls of the sensors. For example, should the edge 13b of the web 13 interrupt a substantial portion of the fluid jet stream from the orifice 24, the remaining portion of the jet stream will impinge substantially entirely upon the wall 25b thereby urging the sensor 25 and the leg portion 38 away from the opening 39. Therefore, not only does the static pressure within the fluid passage 40 serve to urge the leg portion 38 and sensor 25 away from the opening 39 but also does the fluid jet stream from the orifice 24 serve to urge the leg 38 and sensor 25 away from the opening 39. On the other hand, should the edge 13b of the web 13 move away from the sensing head 14, the portion of the jet stream impinging upon the wall 25a increases. This action will cause the sensor 25 and the leg portion 38 to be urged toward the opening 39 thereby increasing the static pressure within the passage 40.

It will be understood that variations and modifications may be effected without departing from the spirit and scope of the novel concepts of this invention.

I claim as my invention:

1. An apparatus for sensing and controlling the width of a continuously moving web including:

first and second actuators;

first and second web edge sensing devices movably connected to said first and second actuators respectively, said sensing devices positioned in opposite sides of the web;

connecting means for connecting said first actuator to said second sensing device to cause said first actuator to move in response to movement of said second sensing device;

first control means connected between said first sensing device and said first actuator for controlling said first actuator in response to deviations of position of the edge of the web which is in proximity therewith to move said first sensing device in the direction of deviation of the edge of the web;

second control means connected between said second sensing device and said second actuator for controlling said second actuator in response to deviation of position of the edge of the web which is in proximity therewith to move said second sensing device and said first actuator in the direction of the deviation of the edge of the web; and means controlled by one of said control means to change the width of the web prior to passing between said first and second sensors.

2. The apparatus of claim 1 wherein the web is a thin plastic film extruded in tubular form: and said last-mentioned means is in fluid communication with the interior of the tubular film to vary the pressure therein thereby controlling the diameter of the tubular film as a function of film width.

3. The apparatus of claim 1 wherein said actuator, sensing device, control means, and said last-mentioned means, are operated by air pressure.

4. The apparatus of claim 3 wherein said last-mentioned means includes:
- a control valve having first, second, and third chambers in axial alignment;
- first, second and third piston means positioned in said first, second and third chambers respectively, said first piston means defining a control chamber and an atmospheric chamber on opposite sides thereof;
- said second piston means defining a pressure chamber and a vacuum chamber on opposite sides thereof;
- and said third piston means defining a control chamber and a reference chamber on opposite sides thereof;
- said first, second and third piston means connected together for common movement within their respective chambers;
- said control chambers within said control valve in fluid communication with said first control means, said reference chamber in fluid communication with a supply of reference pressure;
- a pressure supply conected to said pressure chamber within said control valve;
- a vacuum supply connected to said vacuum chamber within said control valve;
- a web size control device;
- output means connected between said control valve and said web sized control device to deliver output control signals to said web sized control device; and
- whereby, deviations of the edge of the web will cause said first sensing device to develop a control signal in said control means which, in turn, will cause the pressure in said control chambers of said control valve to change in response thereto, thereby moving said second piston within said control valve to deliver an output signal to said web sized control device to correct the size of the web.

5. The apparatus of claim 1 wherein said last mentioned means includes reference biasing means for dampening the operation of said last-mentioned means.

6. The apparatus of claim 5, wherein said reference biasing means is an air supply of predetermined pressure.

7. Apparatus of claim 6, wherein said predetermined pressure of said reference biasing means is 5 p.s.i.

8. The apparatus of claim 1, wherein each of said control means includes an air passage having an opening at said sensing device, and wherein each of said sensing devices includes:
- a sensing head for receiving the edge of the web, said sensing head having an orifice in fluid communication with an air supply for directing an air jet stream past the edge of the web;
- a U-shaped spring secured to said sensing head such that a portion of said spring is obstructing the air flow from the opening in said air passage; and
- a sensor connected to said U-shaped spring and position in the path of the air jet stream to cause said portion of said spring to obstruct the air flow from the opening in said air passage by various degrees depending upon the position of the edge of the web passing through said sensing head.

9. The apparatus of claim 8, wherein said sensor is wedged shaped.

10. An apparatus for sensing deviation in position of the edge of a moving web including:
- a sensing head having first and second extended portions for receiving the edge of the web therebetween,
- said first extended portion having an orifice for directing a fluid jet stream toward said second extended portion;
- a pressure fluid supply connected to said first extended portion and in fluid communication with said orifice;
- a fluid passage connected to said second extended portion, said fluid passage having an opening for passing a fluid jet stream which is substantially perpendicular to the fluid jet stream from said orifice;
- resilient means secured to said sensing head and having a portion thereof obstructing fluid flow from the opening of said fluid passage;
- a sensor secured to said resilient means and positioned in the path of the fluid jet stream so as to sense the fluid jet stream and vary the position of said resilient means relative to the opening of said passage, thereby causing the static pressure within said fluid passage to vary; and
- actuating means mechanically connected to said sensing head and in fluid communication with said fluid passage for actuation by variations of static pressure within said fluid passage.

11. The apparatus of claim 10 wherein said resilient means is a U-shaped spring which has a movable extended leg in proximity with the opening of said fluid passage to obstruct the fluid flow therefrom.

12. The apparatus of claim 11, wherein said sensor is tapered having the side of greatest dimension secured to the movable leg of said U-shaped spring and the side of least dimension extended toward the fluid jet stream from said orifice.

References Cited

UNITED STATES PATENTS

| 2,051,781 | 8/1936  | Brown       | 18—2 |
| 2,810,316 | 10/1957 | Snyder.     |      |
| 3,212,127 | 10/1965 | Flook et al.| 18—2 |
| 3,311,947 | 4/1967  | Fenley      | 18—2 |

WILLIAM J. STEPHENSON, *Primary Examiner.*